United States Patent [19]

Spangler et al.

[11] 4,126,898

[45] Nov. 21, 1978

[54] PROGRAMMABLE CALCULATOR INCLUDING TERMINAL CONTROL MEANS

[75] Inventors: Richard M. Spangler; Eugene V. Burmeister; Frank E. Cada; Wayne F. Covington; Chris J. Christopher; Myles A. Judd; Freddie W. Wenninger; Robert E. Watson; Kent W. Simcoe, all of Loveland, Colo.

[73] Assignee: Hewlett-Packard Company, Palo Alto, Calif.

[21] Appl. No.: 760,802

[22] Filed: Jan. 19, 1977

Related U.S. Application Data

[60] Division of Ser. No. 469,727, May 30, 1974, Pat. No. 4,012,725, which is a continuation of Ser. No. 269,899, Jul. 7, 1972, abandoned.

[51] Int. Cl.² .................... G06F 15/02; G06F 11/00; G06F 3/04; G06F 13/00
[52] U.S. Cl. .................... 364/900; 364/706; 364/709; 364/715
[58] Field of Search ... 364/200 MS File, 900 MS File, 364/706, 709, 710, 715, 716; 178/17 C; 340/147 SY

[56] References Cited

U.S. PATENT DOCUMENTS

| 3,438,002 | 4/1969 | Murgio | 364/200 |
|---|---|---|---|
| 3,454,936 | 7/1969 | Bridge | 364/200 |
| 3,564,509 | 2/1971 | Perkins | 364/200 |
| 3,571,802 | 3/1971 | Serra | 364/900 |
| 3,573,747 | 4/1971 | Adams | 364/200 |
| 3,582,904 | 6/1971 | Bradwein | 364/900 |
| 3,588,834 | 6/1971 | Pedersen | 364/900 |
| 3,618,031 | 11/1971 | Kennedy | 364/200 |
| 3,618,037 | 11/1971 | Wollum | 364/200 |
| 3,633,169 | 1/1972 | Bickford | 364/200 |
| 3,676,846 | 7/1972 | Busch | 364/200 |
| 3,676,858 | 7/1972 | Finch | 364/200 |
| 3,699,525 | 10/1972 | Klavins | 364/200 |
| 3,842,405 | 10/1974 | Key | 364/200 |
| 3,859,635 | 1/1975 | Watson | 364/200 |

OTHER PUBLICATIONS

"Computer Programming Fundamentals: Based on the IBM System/360", H. D. Leeds & G. M. Weinberg, McGraw-Hill, 1970, pp. 166-170, 490-537, 584.

*Primary Examiner*—James D. Thomas
*Attorney, Agent, or Firm*—William E. Hein

[57] ABSTRACT

An adaptable programmable calculator is provided by employing a modular read-write and read-only memory unit capable of being expanded to provide the calculator with additional program and data storage functions oriented towards the environment of the user, a central processing unit capable of performing both serial binary and parallel binary-coded-decimal arithmetic, and an input-output control unit capable of bidirectionally transferring information between the memory or central processing units and a number of input and output units. The memory, central processor, and input-output control units are controlled by a microprocessor included in the central processing unit.

The input and output units include a keyboard input unit with a plurality of alphanumeric keys, a magnetic tape cassette reading and recording unit capable of bidirectionally transferring programs and data between a magnetic tape and the calculator and, a solid state output display unit capable of displaying every alphabetic and numeric character and many other symbols individually or in combination. All of these input and output units are included within the calculator itself. An output printer, an X-Y plotter, a typewriter, a teletypewriter, a magnetic or paper tape reading and recording unit, an extended read-write memory unit, a magnetic disc reading and recording unit, a modem for connecting the calculator via telephone lines to a remotely located computer, and many other peripheral input and output units may also be employed with the calculator.

The calculator may be operated manually by the user from the keyboard input unit or automatically by a program stored within the memory unit to perform calculations and provide an output indication of the results thereof. It may also be employed to load programs into the memory unit from the keyboard input unit, to separately or collectively transfer data and programs bidirectionally between the memory unit and an external magnetic tape and to code programs or sections thereof stored in the memory unit as being secure when they are transferred to an external magnetic tape, thereby preventing users of the calculator from again transferring them to an external magnetic tape or obtaining any indication of the individual program steps once they are reloaded into the calculator. In addition, the calculator may be employed to edit programs stored in the memory unit and to print out program lists, labels, and messages.

The calculator employs an extended version of BASIC computer language and allows the user to enter a line comprising an alphanumeric statement into the calculator from the keyboard input unit while visually observing an alphanumeric display of that line to check for errors therein, permitting the user to cause the entered lines to be immediately executed by the calculator or stored as part of a program within the memory unit, and permitting the user to subsequently recall the executed or stored line so that it may be reinspected, reevaluated, and, if necessary, edited and executed and re-executed, or restored in edited form. Any entered or recalled information may be edited by employing the keyboard input unit to selectively delete or replace incorrect or undesired portions of the information or to selectively insert corrected or previously omitted portions thereof on a line-by-line or character-by-character basis. Syntax errors are automatically detected by the calculator when the entered statement is terminated, and execution errors are automatically detected upon attempted execution of the statement or statements. Both types of errors are indicated to the user via error messages displayed by the output display unit. In the event the calculator is being used in combination with an external printer unit indications of syntax or execution errors may, if desired, be printed.

The calculator employs a compiler for converting each statement entered into the calculator in BASIC language into an internal stored format. It also employs an uncompiler for regenerating in the BASIC language statement any entered line converted to the internal stored format. The compiler and uncompiler operate on a line-by-line basis.

The magnetic tape cassette reading and recording unit employed in the calculator allows the user to chain together several program segments and allows program manipulation of several blocks of data on an individual basis, thereby providing more efficient utilization of the available calculator memory. An interrupt feature of the cassette unit facilitates searching for a particular file located on a magnetic tape at the same time the calculator is performing other functions.

11 Claims, 3 Drawing Figures

PROGRAMMABLE CALCULATOR INCLUDING TERMINAL CONTROL MEANS

CROSS REFERENCE TO RELATED APPLICATION

This application is a division of, and incorporates by reference the subject matter of, application Ser. No. 469,727, filed on May 30, 1974, now issued as U.S. Pat. No. 4,012,725, which is in turn a continuation of application Ser. No. 269,899, filed on July 7, 1972, now abandoned.

BACKGROUND OF THE INVENTION

This invention relates generally to calculators and improvements therein and more particularly to programmable calculators that may be controlled both manually from the keyboard input unit and automatically by a stored program loaded into the calculator from the keyboard input unit or an external record member.

Computational problems may be solved manually, with the aid of a calculator (a dedicated computational keyboard-driven machine that may be either programmable or nonprogrammable), or a general purpose computer. Manual solution of computational problems is often very slow, so slow in many cases as to be an impractical, expensive, and ineffective use of the human resource, particularly when there are other alternatives for solution of the computational problems.

Nonprogrammable calculators may be employed to solve many relatively simple computational problems more efficiently than they could be solved by manual methods. However, the keyboard operations or language employed by these calculators is typically trivial in structure, thereby requiring many keyboard operations to solve more general arithmetic problems. Programmable calculators may be employed to solve many additional computational problems at rates hundreds of times faster than manual methods. However, the keyboard language employed by these caculators is also typically relatively simple in structure, thereby again requiring many keyboard operations to solve more general arithmetic problems.

Another basic problem with nearly all of the keyboard languages employed by conventional programmable and nonprogrammable calculators is that they allow the characteristics of the hardware of the calculator to show through to the user. Thus, the user must generally work with data movement at the hardware level, for example, by making sure that data is in certain storage registers before specifying the operations to be performed with that data and by performing other such "housekeeping" functions. In addition, these languages have been unique to a particular calculator and have not been generally familiar to those persons skilled in the computer and calculator arts.

In the past both programmable and nonprogrammable calculators have generally had very limited memories, thereby severely limiting the size of the computational problems they could be employed to solve. Because of these limitations, the relatively simple structure of the keyboard languages employed by these calculators and the "housekeeping" requirements associated with their languages have not heretofore been serious shortcomings. However, with advances in technology, the cost of memories has decreased to a point where larger memories could be economically included in programmable calculators. These larger memories have allowed larger and more sophisticated problems to be handled by programmable calculators. As a result the shortcomings of conventional calculator languages have become more critical, thereby creating the need for higher level keyboard languages.

In addition to the foregoing shortcomings, conventional programmable calculators generally have less capability and flexibility than is required to meet the needs of many users. For example, they typically cannot be readily expanded and adapted by the user to increase the amount of program and data storage memory or to perform many special keyboard functions oriented toward the environment of the user.

In some conventional programmable calculators a program stored within the calculator can be recorded onto an external magnetic record member and can later be reloaded back into the calculator from the magnetic record member. However, data and programs stored within these calculators typically cannot be separately recorded onto an external magnetic record member and later separately reloaded back into the calculator therefrom. Moreover, these calculators typically have no provision for making a program secure when it is recorded onto an external magnetic record member. Any user may therefore re-record the program or obtain an indication of the individual program steps once the program is reloaded into the calculator.

Conventional programmable calculators with self-contained output display units typically have little or no alpha capability and typically can only display the contents of one or more selected registers. They are therefore typically unable to display a line containing an alphanumeric statement or an alphabetic message such as might be used, for example, to inform the user how to run programs with which he may be unfamiliar. Such features would be very helpful to the user both in editing programs and in simplifying their use.

Conventional programmable calculators typically have little or no capability for editing keyboard entries or programs stored within the calculator. For example, they typically have no provision for deleting, replacing, and inserting information included in or omitted from a keyboard entry or internally-stored program on a character-by-character or line-by-line basis. As another example, they typically have no provision for directly recalling any line of an internally-stored program. As a further example, they typically have no provision for automatically accommodating and sequencing program statements which are entered by the user in random order. Such features would be very helpful to the user in editing programs.

Conventional computers typically pose an interfacing problem between the user and the machine. This interface requirement takes the form of a machine-level operator with special abilities for maintaining the software system in operative condition for the user. Computer time sharing systems comprising a centrally located computer and a multiplicity of remotely located user terminals connected thereto by telephone lines have partially solved the user/machine interface problem. However, these systems lack the same flexibility as conventional computers in that they are only programmable and provide no convenient non-programmable method for performing relatively simple calculations. Both types of systems lack provision for editing a program statement from a keyboard without the necessity of retyping the entire statement.

SUMMARY OF THE INVENTION

The principal object of this invention is to provide an improved programmable calculator that has more capability and flexibility than conventional programmable calculators, that is smaller, less expensive and more efficient in calculating elementary mathematical functions than conventional computer systems, and that is easier to utilize than conventional programmable calculators or computer systems.

Another object of this invention is to provide a programmable calculator in which the user may, when the calculator is configured with a terminal plug-in read-only memory module and an external modem for transmitting and receiving information over telephone lines, select from a keyboard unit and baud rate from a continuously variable range of baud rates.

Another object of this invention is to provide a programmable calculator in which the user may, when the calculator is configured with a terminal plug-in read-only memory module and an external modem for transmitting and receiving data over telephone lines, select by actuating a single key of a keyboard unit either odd or even parity of transmitted data.

Another object of this invention is to provide a programmable calculator in which the user may, when the calculator is configured with a terminal plug-in read-only memory module, enter free text information from a keyboard input unit, an external magnetic record member, or any peripheral input unit, edit such information on a line-by-line or character-by-character basis, store such information on an external magnetic record member, and thereafter transmit such information, for example, to a remotely located time-sharing computer system.

Another object of this invention is to provide a programmable calculator in which the user may, when the calculator is configured with a terminal plug-in read-only memory module, generate and transmit any ASCII codes.

Another object of this invention is to provide a programmable calculator in which the user may, when the calculator is configured with a terminal plug-in read-only memory module and an external modem for transmitting and receiving information over telephone lines, make calculations and run programs locally at the same time as, for example, the calculator is on-line with and running programs through a remotely located time-sharing computer system.

Another object of this invention is to provide a programmable calculator in which the user may, when the calculator is configured with a terminal plug-in read-only memory module, receive BASIC language programs from remote locations and thereafter run them locally on the calculator.

Other and incidental objects of this invention will become apparent from a reading of this specification and an inspection of the accompanying drawings.

These objects are accomplished according to the illustrated preferred embodiment of this invention by employing a keyboard input unit, a magnetic tape cassette reading and recording unit, a solid state output display unit, an optional external output printer unit, an input-output control unit, a memory unit, and a central processing unit to provide an adaptable programmable calculator having manual operating, automatic operating, program entering, magnetic tape reading, magnetic tape recording, and alphanumeric display and print modes. The keyboard input unit includes a group of data keys for entering numeric data into the calculator, a group of control keys for controlling the various modes and operations of the calculator and the format of the output display, a group of alphanumeric keys arranged as a typewriter keyboard for entering statements, and a group of user-definable keys. All of the data and alphanumeric keys and some of the control keys may also be employed for programming the calculator.

The magnetic tape cassette reading and recording unit includes a reading and recording head, a drive mechanism for driving a magnetic tape past the reading and recording head, and reading and recording drive circuits coupled to the reading and recording head for bidirectionally transferring information between the magnetic tape and the calculator as determined by keyboard commands or commands which are part of a stored program.

The input-output control unit includes a sixteen-bit universal shift register serving as an input-output register into which information may be transferred serially from the central processing unit or in parallel from the keyboard input and magnetic tape cassette reading and recording units and from which information may be transferred serially to the central processing unit or in parallel to the solid state output display, magnetic tape cassette reading and recording, and output printer units. It also includes control logic responsive to the central processing unit for controlling the transfer of information between these units. The input-output control unit may also be employed to perform the same functions between the central processing unit and peripheral units including, for example, an external printing unit, a digitizer, a marked card reader, an X-Y plotter, an external magnetic tape unit a disc, a typewriter, and a modem. A plurality of peripheral units may be connected at the same time to the input-output control unit by simply plugging interface modules associated with the selected peripheral units into receptacles provided therefore in a rear panel of the calculator housing.

The memory unit includes a modular random-access read-write memory having a dedicated system area and a separate user area for storing program statements and/or data. The user portion of the read-write memory may be expanded without increasing the overall dimensions of the calculator by the addition of a program storage module. Additional read-write memory made available to the user is automatically accommodated by the calculator, and the user is automatically informed when the storage capacity of the read-write memory has been exceeded.

The memory unit also includes a modular read-only memory in which routines and subroutines of assembly language instructions for performing the various functions of the calculator are stored. These routines and subroutines of the read-only memory may be expanded and adapted by the user to perform additional functions oriented toward the specific needs of the user. This is accomplished by simply plugging additional read-only memory modules into receptacles provided therefore in a side panel of the calculator housing. Added read-only memory modules are automatically accommodated by the calculator and are accessed by the calculator through a series of mnemonic tables. These tables contain mnemonics which are additions to the calculator's programming language.

Plug-in read-only memory modules include, for example, a matrix module, a string variables module, a plotter module, an extended input-output module, and a terminal module. The matrix module makes available to the user standard BASIC language matrix functions plus an additional function which returns the determinant of a previously defined suare matrix. The string variables module makes available to the user standard BASIC language string variables operations. The plotter module enables the user to conveniently plot and label on an external X-Y plotter. The extended input-output module allows the calculator to be used with a wide variety of peripheral input-output units. The terminal module facilitates interfacing the calculator with a modem for communicating, for example, with remotely located time-sharing computer systems. It further allows free text editing and storage.

The memory unit further includes a pair of recirculating sixteen-bit serial shift registers. One of these registers serves as a memory address register for serially receiving information from an arithmetic-logic unit included in the central processing unit, for parallel addressing any memory location designated by the received information back to the arithmetic-logic unit. The other of these registers serves as a memory access register for serially receiving information from the arithmetic-logic unit, for writing information in parallel into any addressed memory location, for reading information in parallel from any addressed memory location, and for serially transferring information to the arithmetic-logic unit. It also serves as a four-bit parallel shift register for transferring four bits of binary-coded-decimal information in parallel to the arithmetic-logic unit.

The central processing unit includes four recirculating sixteen-bit serial shift registers, a four-bit serial shift register, the arithmetic-logic unit, a programmable clock, and a microprocessor. Two of these sixteen-bit serial shift registers serve as accumulator registers for serially receiving information from and serially transferring information to the arithmetic-logic unit. The accumulator register employed is designated by a control flip-flop. One of the accumulator registers also serves as a four-bit parallel shift register for receiving four bits of binary-coded-decimal information in parallel from and transferring four bits of such information in parallel to the arithmetic-logic unit. The two remaining sixteen-bit serial shift registers serve as a program counter register and a qualifier register, respectively. They are also employed for serially receiving information from and serially transferring information to the arithmetic-logic unit. The four-bit serial shift register serves as an extend register for serially receiving information from either the memory access register or the arithemtic-logic unit and for serially transferring information to the arithmetic-logic unit.

The arithmetic-logic unit is employed for performing one-bit serial binary arithmetic, four-bit parallel binary-coded-decimal arithmetic, and logic operations. It may also be controlled by the microprocessor to perform bidirectional direct and indirect arithmetic between any of a plurality of the working registers and any of the registers of the read-write memory.

The programmable clock is employed to supply a variable number of shift clock pulses to the arithmetic-logic unit and to the serial shift registers of the input-output, memory, and central processing units. It is also employed to supply clock control signals to the input-output control logic and to the microprocessor.

The microprocessor includes a read-only memory in which a plurality of microinstructions and codes are stored. These microinstructions and codes are employed to perform the basic instructions of the calculator. They include a plurality of coded and non-coded microinstructions for transferring control to the input-output control logic, for controlling the addressing and accessing of the memory unit, and for controlling the operation of the two accumulator registers, the program counter register, the extend register and the arithmetic-logic unit. They also include a plurality of clock codes for controlling the operation of the programmable clock, a plurality of qualifier selection codes for selecting qualifiers and serving as primary address codes for addressing the read-only memory of the microprocessor, and a plurality of secondary address codes for addressing the read-only memory of the microprocessor. In response to a control signal from a power supply provided for the calculator, control signals for the programmable clock, and qualifier control signals from the central processing and input-output control units, the microprocessor issues the microinstructions and codes stored in the read-only memory of the microprocessor as required to process either binary or binary-coded-decimal information entered into or stored in the calculator.

In the keyboard mode, the calculator is controlled by keycodes sequentially entered into the calculator from the keyboard input unit by the user. The solid state output display unit displays either the alphanumeric representation of the keys as they are depressed or a numeric representation of output data or alphanumeric user instructions or program results. An external output printer unit may be controlled by the user to selectively print a numeric representation of any numeric data entered into the calculator from the keyboard input unit, a numeric representation of any result calculated by the calculator, or a program listing on a line-by-line basis of the statements entered.

When the calculator is in the keyboard mode, it may also be operated in a print-all printing mode. The output printer unit then prints out each program line as it is entered by the user.

In the program running mode, the calculator is controlled by automatically obtaining an internal representation of the program statements stored in the user storage section of the read-write memory. During automatic operation of the calculator, data may be obtained from the memory unit as designated by the program, from the keyboard input unit while the operation of the calculator is stopped for data either by the program or by the user, or from the magnetic tape cassette unit as designated by the program.

When the calculator is in the program running mode, the user may also selectively employ a trace mode to check the execution of the program line-by-line in order to determine whether the program, as entered into the calculator, does in fact carry out the desired sequence of statements.

In the program entering mode, statements are sequentially entered by the user into the calculator from the keyboard input unit and are translated into an internal stored format which consists of a series of operation codes and operand names and are thereafter stored as statements of a program in the user storage section of the read-write memory.

The magnetic tape cassette reading and recording unit may be employed by the user to separately load either data, BASIC language programs, assembly language programs, or sets of user-definable key definitions into the calculator from an external magnetic tape cassette.

The magnetic tape cassette reading and recording unit may also be employed by the user to separately record either data, BASIC language programs, or sets of user-definable key definitions stored in the user section of the read-write memory onto an external magnetic tape cassette. Programs, or portions thereof, may be coded by the user as being secure when they are recorded onto an external magnetic tape cassette. The calculator detects such programs when they are re-loaded into the calculator and prevents the user from re-recording them or obtaining any listing or other indication of the individual program steps contained in the secured portions of such programs.

DESCRIPTION OF THE DRAWINGS

The following figures have been numbered in correspondence with the same figures of allowed U.S. Patent application Ser. No. 469,727, cited above as being incorporated herein by reference.

DESCRIPTION OF THE PREFERRED EMBODIMENT

GENERAL DESCRIPTION

Figure 1:
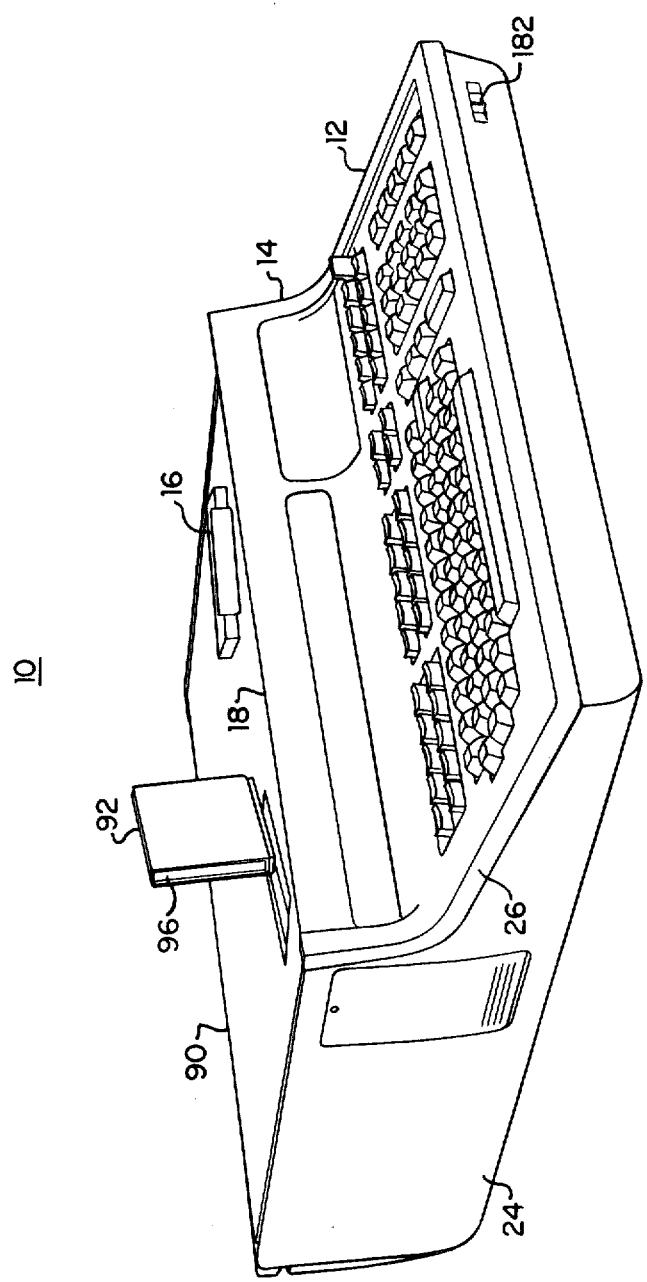
FIG. 1 is a front perspective view of an adaptable programmable calculator according to the preferred embodiment of this invention.

Referring to FIG. 1, there is shown an adaptable programmable calculator 10 including both a keyboard input unit 12 for entering information into and controlling the operation of the calculator and the magnetic tape cassette reading and recording unit 14 for recording information stored within the calculator onto one or more external tape cassettes 16 and for subsequently loading the information recorded on these and other similar magnetic tape cassettes back into the calculator. The calculator also includes a solid state output display unit 18 for displaying alphameric information stored within the calculator. All of these input and output units are mounted within a single calculator housing 24 adjacent to a curved front panel 26 thereof.

Figure 3A:
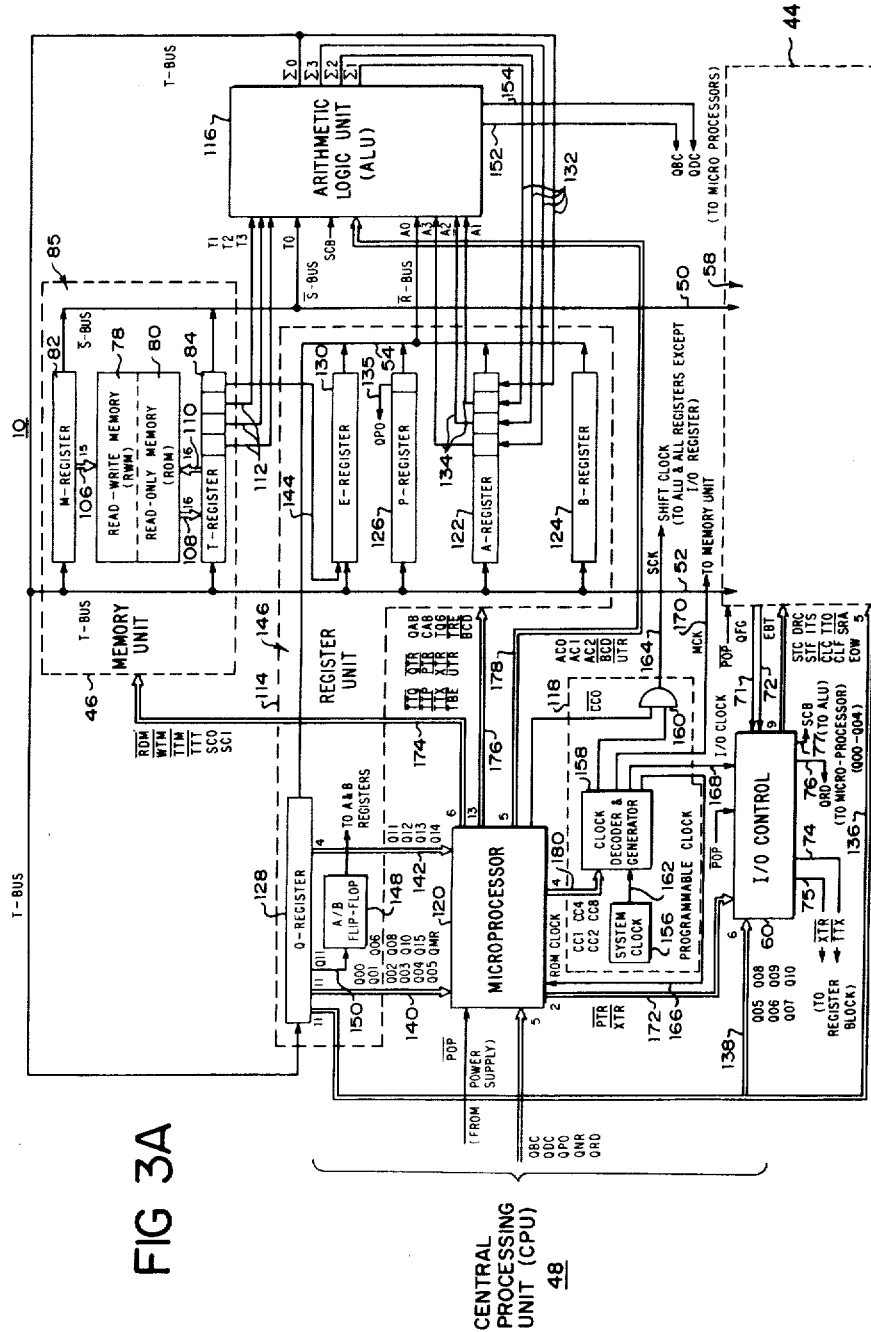
FIGS. 3A-B are a simplified block diagram of the adaptable programmable calculator of FIG. 1.
Figure 3B:
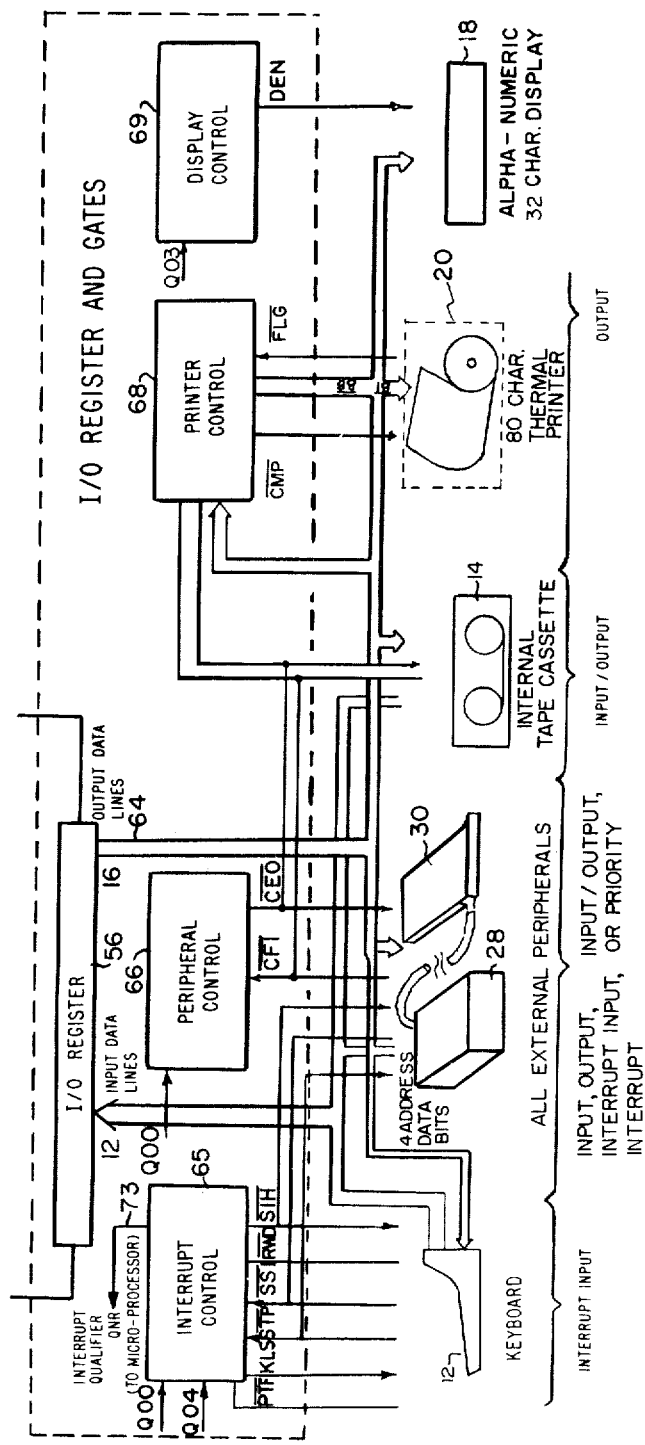

Referring to the simplified block diagram shown in FIGS. 3A-B, it may be seen that the calculator also includes an input-output control unit 44 (hereinafter referred to as the I/O control unit) for controlling the transfer of information to and from the input and output units, a memory unit 46 for storing and manipulating information entered into the calculator and for storing routines and subroutines of basic instructions performed by the calculator, and a central processing unit 48 (hereinafter referred to as the CPU) for controlling the execution of the routines and subroutines of basic instructions stored in the memory unit as required to process information entered into or stored within the calculator. The calculator also includes a bus system comprising an S-bus 50, a T-bus 52, and an R-bus 54 for transferring information from the memory and I/O control units to the CPU, from the CPU to the memory and I/O control units, and between different portions of the CPU. It further comprises a power supply for supplying DC power to the calculator and peripheral units employed therewith and for issuing a control signal POP when power is supplied to the calculator.

The I/O control unit 44 includes an input-output register 56 (hereinafter referred to as the I/O register), associated I/O gating control circuitry 58, and input-output control logic 60 (hereinafter referred to as the I/O control). I/O register 56 comprises a universal sixteen-bit shift register into which information may be transferred either bit-serially from CPU 48 via T-bus 52 or in parallel from keyboard input unit 12, magnetic tape cassette reading and recording unit 14, and peripheral input units 28 such as the marked card reader via twelve input party lines 62. Information may be transferred from I/O register 56 either bit-serially to CPU 48 via S-bus 50 or in parallel to magnetic tape cassette reading and recording unit 14, solid state output display unit 18, output printer unit 20, and peripheral output units 28 such as the X-Y plotter or the typewriter via sixteen output party lines 64.

I/O gating control circuitry 58 includes control circuits for controlling the transfer of information into and out of I/O register 56 in response to selected I/O qualifier control signals from CPU 48 and selected I/O control instructions from I/O control 60. It also includes an interrupt control circuit 65, a peripheral control circuit 66, a printer control circuit 68, and a display control circuit 69 for variously controlling the input and output units and issuing control signals QFG and EBT to I/O control 60 via two output lines 71 and 72. These last mentioned control circuits variously perform their control functions in response to control signal POP from the power supply, I/O qualifier control signals from CPU 48, I/O control instructions from I/O control 60, and control signals from keyboard input unit 12. Interrupt control circuit 65 initiates the transfer of information into I/O register 56 from keyboard input unit 12 or interrupting peripheral input units 28 such as the marked card reader and issues a qualifier control signal QNR to CPU 48 via output lines 73. Peripheral control circuit 66 enables interface modules 30 plugged into the calculator to respond to information from I/O register 56, control associated peripheral units 28, transfer information to and/or receive information from associated peripheral units 28, and in some cases initiate the transfer of information to I/O register 56 from the interface modules themselves. Printer control circuit 68 and display control circuit 69 enable output display unit 18, and output printer unit 20, respectively, to respond to information from I/O register 56.

When a basic I/O instruction obtained from memory unit 46 is to be executed, CPU 48 transfers control to I/O control 60 by issuing a pair of I/O microinstructions PTR and XTR thereto. In response to these I/O microinstructions from CPU 48, control signal POP from the power supply, control signals QFG and EBT from I/O gating control circuitry 58, and I/O qualifier and clock control signals from CPU 48, I/O control 60 selectively issues one or more I/O control instructions to gating control circuitry 58 as required to execute the basic I/O instructions designated by CPU 48 and issues control signals, TTX, XTR, QRD, and SCB to CPU 48 via output lines 74-77. The I/O qualifier control signals issued to I/O control 60 and gating control circuitry 58 by CPU 48 are derived from the basic I/O instruction to be executed. Those qualifier control signals issued to I/O control 60 designate the specific I/O control instructions to be issued by I/O control 60, while those issued to gating control circuitry 58 designate selected control circuits to be employed in executing the basic I/O instruction.

Memory unit 46 includes a modular random-access read-write memory 78 (hereinafter referred to as the RWM), a modular read-only memory 80 (hereinafter referred to as the ROM), a memory address register 82 (hereinafter referred to as the M-register), a memory access register 84 (hereinafter referred to as the T-register), and control circuitry 85 for these memories and registers. The RWM 78 and ROM 80 comprise MOS-type semiconductor memories.

M-register 82 of the memory unit comprises a recirculating sixteen-bit serial shift register into which information may be transferred bit-serially from CPU 48 via T-bus 52 and out of which information may be transferred bit-serially to CPU 48 via S-bus 50. Information shifted into M-register 82 may be employed to address any word in RWM 78 or ROM 80 via fifteen output lines 106.

T-register 84 of the memory unit comprises a recirculating sixteen-bit serial shift register into which information may be transferred either bit-serially from CPU 48 via T-bus 52 or in parallel from any addressed word in RWM 78 and ROM 80 via sixteen parallel input lines 108. Information may be transferred from T-register 84 either bit-serially to CPU 48 via S-bus 50 or parallel to any addressed word in RWM 78 via sixteen parallel output lines 110. The four least significant bits of information contained in T-register 84 may comprise binary-coded-decimal information and may be transferred from the T-register in parallel to CPU 48 via three parallel output lines 112 taken with S-bus 50.

The control circuitry 85 of the memory unit controls these transfers of information into and out of M-register 82 and T-register 84, controls the addressing and accessing of RWM 78 and ROM 80, and refreshes RWM 78. It performs these functions in response to memory microinstructions, memory clock pulses, and shift clock pulses from CPU 48.

CPU 48 includes a register unit 114, an arithmetic-logic unit 116 (hereinafter referred to as the ALU), a programmable clock 118, and a microprocessor 120. Register unit 114 comprises four recirculating sixteen-bit shift registers 122, 124, 126, and 128 and one four-bit shift register 130. Shift registers 122 and 124 serve as sixteen-bit serial accumulator registers (hereinafter referred to as the A-register and the B-register, respectively) into which information may be transferred bit-serially from ALU 116 via T-bus 52 and out of which information may be transferred bit-serially to ALU 116 via R-bus 54. The four least significant bit positions of A-register 122 also serve as a four-bit parallel accumulator register into which four bits of binary-coded-decimal information may be transferred in parallel from ALU 116 via four parallel input lines 132 and out of which four bits of binary-coded-decimal information may also be transferred in parallel to ALU 116 via three parallel output lines 134 taken with R-bus 54.

Shift register 126 serves as a sixteen-bit system program counter (hereinafter referred to as the P-register) into which information may be transferred bit-serially from ALU 116 via T-bus 52 and out of which information may be transferred bit-serially to ALU 116 via R-bus 54. Information contained in the least significant bit position of P-register 126 may also be transferred as a qualifier control signal QP0 to microprocessor 120 via output line 135.

Shift register 128 serves as a sixteen-bit qualifier register (hereinafter referred to as the Q-register) into which information may be transferred bit-serially from ALU 116 via T-bus 52 and out of which information may be transferred bit-serially to ALU 116 via R-bus 54. Information contained in the five least significant bit positions of Q-register 128 is transferred to I/O gating control circuitry 58 as five one-bit I/O qualifier control signals Q00–Q04 via five parallel output lines 136, and information contained in the six next least significant bit positions of the Q-register is transferred to I/O control 60 as six one-bit I/O qualifier control signals Q05–Q10 via six parallel output lines 138. Similarly, information contained in the seven least significant, the ninth and eleventh least significant, and the most significant bit positions of Q-register 128 and information derived from the thirteenth, fourteenth, and fifteenth bit positions of the Q-register may be transferred to microprocessor 120 as eleven one-bit microprocessor qualifier control signals Q00–Q06, Q08, Q10, Q15, and QMR via eleven output lines 140. Information contained in the twelfth through the fifteenth least significant bit positions of Q-register 128 may be transferred to microprocessor 120 as a four-bit primary address code via four parallel output lines 142.

Shift register 130 serves as a four-bit serial extend register (hereinafter referred to as the E-register) into which information may be transferred bit-serially either from ALU 116 via T-bus 52 or from the least significant bit position of T-register 84 via input line 144. Information may also be transferred out of E-register 130 to ALU 116 via R-bus 54.

Register unit 114 also includes control circuitry 146 for controlling the transfer of parallel binary-coded-decimal information into and out of A-register 122 and the transfer of serial binary information into and out of A-register 122, B-register 124, P-register 126, Q-register 128, and E-register 130. This is accomplished in response to register microinstructions from microprocessor 120, control signals TTX and XTR from I/O control 60, and shift clock control pulses from programmable clock 118. Control circuitry 146 includes a flip-flop 148 (hereinafter referred to as the A/B flip-flop) for enabling the transfer of information into and out of either the A-register 122 or the B-register 124 as determined by the state of the A/B flip-flop. The state of A/B flip-flop 148 is initially determined by information Q11 transferred to the A/B flip-flop from the twelfth least significant bit position of Q-register 128 but may be subsequently complemented one or more times by microinstruction CAB from microprocessor 120.

ALU 116 may perform either one-bit serial binary arithmetic on data received from T-register 84 or M-register 82 via S-bus 50 and/or from any register of register unit 114 via R-bus 54 or four-bit parallel binary-coded-decimal arithmetic on data received from T-register 84 via output lines 112 taken with S-bus 50 and/or from A-register 122 via output lines 134 taken with R-bus 54. It may also perform logic operations on data received from memory unit 46 and/or register unit 114 via any of these lines. The arithmetic and logic operations performed are designated by ALU microinstructions from microprocessor 120 and are carried out in response to these microinstructions, shift clock control pulses from programmable clock 118, and control signal SCB from I/O control 60. Information is also transferred from ALU 116 to A-register 122 via output lines 132 or to I/O register 56, M-register 82, T-register 84, or any register of register unit 114 via T-bus 52 in response to microinstructions and control signals applied to these registers. If a carry results while ALU 116 is performing either one-bit serial binary arithmetic or four-bit parallel binary-coded-decimal arithmetic, the ALU issues a corresponding qualifier control signal QBC or QDC to microprocessor 120 via one of two output lines 152 and 154.

Programmable clock 118 includes a crystal-controlled system clock 156, a clock decoder and generator 158, and a control gate 160. System clock 156 issues regularly recurring clock pulses to clock decoder and generator 158 via output line 162. In response to these regularly recurring clock pulses from system clock 156 and to four-bit clock codes from microprocessor 120, clock decoder and generator 158 issues trains of $n$ shift clock pulses to ALU 116, M-register 82, T-register 84, and all of the registers of register unit 114 via output line 164. These trains of $n$ shift clock pulses are employed for shifting a corresponding number of bits of serial information into or out of any of these registers or for shifting a carry bit in the ALU. The number $n$ of pulses in each of these trains may vary from one to sixteen as determined by the number of bits of serial information required during each operation to be performed. In response to a control signal CCO from microprocessor 120, control gate 160 prevents any shift clock pulses from being applied to the ALU or any of these registers. Upon completion of each train of $n$ shift clock pulses, clock decoder and generator 158 issues a ROM clock pulse to microprocessor 120 via output line 166 and an I/O clock pulse to I/O control 60 via output line 168. In response to the regularly recurring clock signal from system clock 56, clock decoder and generator 158 also issues correspondingly regularly recurring memory clock pulses to memory unit 46 via output line 170.

Microprocessor 120 selectively issues two I/O microinstructions to I/O control 60 via two output lines 172, six memory microinstructions to memory unit 46 via six output lines 174, thirteen register microinstructions to register unit 114 via thirteen output lines 176, and five ALU microinstructions to ALU 116 via five output lines 178. It also issues a four-bit clock code associated with each of these microinstructions to clock decoder 158 via four output lines 180. These microinstructions and associated clock codes are issued as determined by the control signal POP from the power supply, the eleven microprocessor qualifier control signals from Q-register 128, the four-bit primary address codes from Q-register 128, and the five microprocessor qualifier control signal from I/O control 60, interrupt control 65, ALU 116, and P-register 126.

We claim:
1. An electronic calculator comprising:
   keyboard input means having processing control means and having a plurality of alphameric keys for entering lines of alphameric information into the calculator, each of said alphameric keys also being representative, either alone or in combination with another one or more of said alphameric keys, of an ASCII character;
   buffer storage means, coupled to said keyboard input means, for storing a line of alphameric information entered into the calculator;
   memory means, coupled to said keyboard input means and buffer storage means, for storing a program of one or more lines of alphameric information entered into the calculator from said keyboard input means; and
   processing means, coupled to said keyboard input means, buffer storage means, and memory means, said processing means being responsive to actuation of said processing control means for selectively executing either a line of alphameric information then stored in said buffer storage means or a program comprising one or more lines of alphameric information then stored in said memory means;
   said processing means including logic means coupled to said keyboard input means and responsive to actuation of predetermined ones of said plurality of alphameric keys, singly or in combination, for generating any one or more of the 256 possible 8-bit binary codes of the ASCII character set and for storing those binary codes as they are generated in said buffer storage means.
2. An electronic calculator as in claim 1 wherein:
   said keyboard input means includes a terminal transmit control key;
   the calculator includes a modem connected to said processing means and coupling the calculator to a telephone line for transmitting alphameric information to and receiving alphameric information from a remotely located apparatus; and
   said logic means is responsive to actuation of said terminal transmit control key for transmitting the ASCII characters represented by the binary codes then stored in said buffer storage means through the modem to the remotely located apparatus.
3. An electronic calculator comprising:
   keyboard input means for entering lines of one or more alphameric characters into the calculator, said keyboard input means including a terminal transmit control key and processing control means;
   memory means for storing a program of one or more lines of one or more alphameric characters entered into the calculator from said keyboard input means;
   buffer storage means, coupled to said keyboard input means and memory means, for storing a line or one or more alphameric characters entered into the calculator;
   processing means, coupled to said keyboard input means, buffer storage means, and memory means, said processing means being responsive to actuation of said processing control means for selectively executing either of a line of one or more alphameric characters then stored in said buffer storage means or the program then stored in said memory means; and
   a modem, coupled to said processing means, for transmitting lines of one or more alphameric characters from the calculator to a remotely located apparatus over a telephone line and for entering lines of one or more alphameric characters into the calculator as they are received over a telephone line from the remotely located apparatus;
   said processing means including logic means coupled to said keyboard input means, memory means, buffer storage means, and processing means, said logic means being responsive to actuation of said terminal transmit control key for causing the line of one or more alphameric characters then stored in said buffer storage means to be transmitted through said modem to the remotely located apparatus, said logic means being further responsive to an inter- rupt signal received through said modem, during entry of lines of one or more alphameric characters from said keyboard input means or during execution of a program by said processing means, for interrupting such keyboard entry or program execution to receive alphameric information through said modem from the remotely located apparatus.

4. An electronic calculator as in claim 3 wherein:

said keyboard input means includes a plurality of keys for entering lines of BASIC language program statements into the calculator to be selectively stored as a program in said memory means and executed by said processing means, editing control means for enabling the user to selectively edit lines of BASIC language program statements as they are being entered into the calculator or after they are stored in said memory means, and terminal save control means for initiating storage into said memory means of lines of BASIC language program statements received from said remotely located apparatus through said modem; and said logic means is responsive to actuation of said terminal save control means for causing the lines of BASIC language program statements received through said modem to be stored in said memory means.

5. An electronic data terminal comprising:

keyboard input means having a plurality of keys for entering alphameric information, including control commands, into the data terminal;

a modem coupling the data terminal to a telephone line for permitting alphameric information to be transmitted to or received from a remotely located apparatus; and logic means coupled to said keyboard input means and modem, said logic means being responsive to entry from said keyboard input means of a terminal control command, including specification of one of a plurality of baud rates, for conditioning the data terminal such that subsequent alphameric information to be transmitted from or received by the data terminal is transmitted or received at the baud rate specified in the terminal control command, said logic means being responsive to entry from said keyboard input means of a parity control command, including specification of one of a plurality of parity states, for conditioning the data terminal such that the parity state specified in the parity control command is associated with alphameric information subsequently transmitted from the data terminal.

6. An electronic calculator comprising:

keyboard input means for entering lines of alphameric information, including control commands and program statements, into the calculator;

memory means, coupled to said keyboard input means, for storing lines of alphameric information, including program statements, entered into the calculator; and processing means, coupled to said keyboard input means and memory means, for processing lines of alphameric information, including control commands and program statements, entered into the calculator;

said processing means including syntax error detection means for checking the syntax of program statements entered into the calculator and for preventing the entry of additional lines of program statements upon detection of a syntax error in an entered program statement; and said processing means further including logic means responsive to processing of a terminal control command entered into the calculator for suppressing operation of said syntax error detection means to permit subsequent entry into the calculator of lines of random alphameric information without regard for any rule of syntax.

7. An electronic calculator as in claim 6 further including one or more peripheral input units for entering lines of alphameric information, including control commands and program statements, into the calculator.

8. An electronic calculator as in claim 6 wherein:

said keyboard input means includes a plurality of editing control keys for enabling the user to edit lines of alphameric information entered into the calculator; and said processing means is responsive to actuation by the user of selected ones of said editing control keys following entry of a line of random alphameric information having no syntactical arrangement for editing that line in accordance with the operations specified by actuation of the selected editing control keys.

9. An electronic calculator as in claim 6 further including magnetic recording means, coupled to said keyboard input means, memory means, and processing means, for storing the contents of said memory means on an external magnetic record member;

said memory means being operative for storing one or more lines of random alphameric information entered into the calculator without regard for any rule pf syntax; and said logic means being responsive to processing of a record control command entered into the calculator for recording the lines of random alphameric information stored in said memory means on an external magnetic record member.

10. An electronic calculator as in claim 6 further including a modem coupling the calculator to a telephone line for permitting alphameric information to be transmitted to or received from a remotely located apparatus;

said logic means being responsive to processing of a terminal list control command entered into the calculator for transmitting, through said modem, lines of random alphameric information stored in said memory means; and said logic means being further responsive to processing of a terminal save control command entered into the calculator for enabling the calculator to receive, through said modem, lines of random alphameric information from the remotely located apparatus and to store those lines so received in said memory means.

11. An electronic calculator as in claim 7 further including a modem coupling the calculator to a telephone line for permitting alphameric information to be transmitted to or received from a remotely located apparatus;

said logic means being responsive to processing of a terminal transmit control command entered into the calculator, following entry of a line of random alphameric information from either said keyboard input means or one of said peripheral input units, for transmitting that line of random alphameric information through said modem to said remotely located apparatus.

* * * * *

UNITED STATES PATENT AND TRADEMARK OFFICE
CERTIFICATE OF CORRECTION

PATENT NO. : 4,126,898

DATED : November 21, 1978

INVENTOR(S) : Richard M. Spangler et al

It is certified that error appears in the above-identified patent and that said Letters Patent are hereby corrected as shown below:

Page 2, line 20, "and" third occurrence should be --or--;

Column 2, line 23, "separatedly" should be --separately--;

Column 4, line 38, after "unit" insert a comma;

Column 5, line 9 "suare" should be --square--;

Column 7, line 63, "S-bus" should be --$\overline{S}$-bus--;

Column 7, line 63, "R-bus" should be --$\overline{R}$-bus--;

Column 8, line 1, "POP" should be --$\overline{POP}$--;

Column 8, line 15, "S-bus" should be --$\overline{S}$-bus--;

Column 8, line 31, "POP" should be --$\overline{POP}$--;

Column 8, line 54, "PTR" should be --$\overline{PTR}$--;

Column 8, line 54, "XTR" should be --$\overline{XTR}$--;

Column 8, line 55, "POP" should be --$\overline{POP}$--;

Column 8, line 62, "TTX" should be --$\overline{TTX}$--;

Column 8, line 62, "XTR" should be --$\overline{XTR}$--;

Column 9, line 17, "S-bus" should be --$\overline{S}$-bus--;

Column 9, line 27, "S-bus" should be --$\overline{S}$-bus--;

Column 9, line 33, "S-bus" should be --$\overline{S}$-bus--;

UNITED STATES PATENT AND TRADEMARK OFFICE
CERTIFICATE OF CORRECTION

PATENT NO. : 4,126,898
DATED : November 21, 1978
INVENTOR(S) : Richard M. Spangler et al It is certified that error appears in the above-identified patent and that said Letters Patent are hereby corrected as shown below:

Column 9, line 52, "R-bus" should be --$\overline{R}$-bus--;

Column 9, line 59, "R-bus" should be --$\overline{R}$-bus--;

Column 10, line 5, "R-bus" should be --$\overline{R}$-bus--;

Column 10, line 32, "R-bus" should be --$\overline{R}$-bus--;

Column 10, line 40, "TTX" should be --$\overline{TTX}$--;

Column 10, line 40, "XTR" should be --$\overline{XTR}$--;

Column 10, line 54, "S-bus" should be --$\overline{S}$-bus--;

Column 10, line 55, "R-bus" should be --$\overline{R}$-bus--;

Column 10, line 57, "S-bus" should be --$\overline{S}$-bus--;

Column 10, line 59, "R-bus" should be --$\overline{R}$-bus--;

Column 11, line 26, "CCO" should be --$\overline{CCO}$--;

UNITED STATES PATENT AND TRADEMARK OFFICE
CERTIFICATE OF CORRECTION

PATENT NO. : 4,126,898
DATED : November 21, 1978
INVENTOR(S) : Richard M. Spangler et al It is certified that error appears in the above-identified patent and that said Letters Patent are hereby corrected as shown below:

Column 11, line 48, "POP" should be --$\overline{POP}$--;

Column 11, line 52, "signal" should be --signals--;

Column 14, line 33, "pf" should be --of--;

Signed and Sealed this

Fourteenth Day of August 1979

[SEAL]

Attest:

Attesting Officer

LUTRELLE F. PARKER
Acting Commissioner of Patents and Trademarks